United States Patent
Whitney et al.

[11] Patent Number: 5,944,288
[45] Date of Patent: Aug. 31, 1999

[54] CONSTANT SUPPORT PIPE HANGER

[75] Inventors: Norman Whitney, Warwick; Frank J. Birch, Pawtucket, both of R.I.

[73] Assignee: Grinnell Corporation, Cranston, R.I.

[21] Appl. No.: 09/022,971

[22] Filed: Feb. 13, 1998

[51] Int. Cl.[6] .................................................. F16M 13/00
[52] U.S. Cl. ............................................ 248/58; 248/571
[58] Field of Search .............................. 248/58, 571, 589, 248/292.13, 542, 317; 188/380; 267/140.2

[56] References Cited

U.S. PATENT DOCUMENTS

| | | | |
|---|---|---|---|
| 2,974,914 | 3/1961 | Sherburne | 248/571 |
| 3,718,305 | 2/1973 | Suozzo | 248/58 X |
| 4,206,898 | 6/1980 | Salter | 248/571 X |
| 4,640,487 | 2/1987 | Salter | 248/571 |

OTHER PUBLICATIONS

Bergen Pipesupport Corp., "Constant Support Hangers", Bergen Constant Supports, Catalog No. 571, Jan. 1957.
Grinnell Coporation, "Constant Support Hangers", Grinnell Pipe Hangers, Catalog PH–97, pp. 1 and 117–139, Jan. 1997.

*Primary Examiner*—Ramon O. Ramirez
*Assistant Examiner*—Long Dinh Phan
*Attorney, Agent, or Firm*—Fish & Richardson P.C.

[57] ABSTRACT

A pipe support hanger having a counterbalance of predetermined load and spring moments about a main pivot through a predetermined range of pipe deflection is adapted for use in vertical and horizontal orientations. The pipe support hanger includes a spring housing, a load spring within the housing and bearing upon a trunnion plate, a frame mounted to the housing and defining a main pivot, a lever mounted to the frame for rotation about the main pivot and having a lever arm with a free end extending from the body, a spring tension rod connected to the load spring at a fixed spring pivot and connected to the lever body at a moveable spring pivot spaced from the main pivot, and a load arm mounted to the frame for rotation about the main pivot, the load arm having first and second ends, with the main pivot therebetween, the first end of the load arm being associated with a pipe load and the second end of the load arm and the free end of the lever arm being joined to pivot in fixed relationship about the main pivot.

1 Claim, 4 Drawing Sheets

CONSTANT SUPPORT PIPE HANGER

This invention relates to pipe support hangers designed for perfect mathematical counterbalance between load and spring moments over an entire range of pipe deflection.

BACKGROUND OF THE INVENTION

Constant support pipe hangers are typically recommended when piping stress is critical and pipe is subject to vertical movement in excess of ½ inch due to thermal expansion. Constant support pipe hangers are also employed at locations where it is necessary to avoid transfer of stress from support to support or onto critical terminals or connecting equipment. Positioning and mounting of constant support hangers is often an issue, e.g. due to crowded and/or restricted environments surrounding the pipe to be supported, and prior art designs have typically included vertical-mount and horizontal-mount support of contrasting configuration.

SUMMARY OF THE INVENTION

According to the invention, a pipe support hanger having a counterbalance of predetermined load and spring moments about a main pivot through a predetermined range of pipe deflection and adapted for use in vertical and horizontal orientations of the pipe support hanger comprises: a spring housing, a load spring disposed within the spring housing and bearing upon a trunnion plate, a frame mounted to the spring housing and defining a main pivot, a lever having a lever body mounted to the frame for rotation about the main pivot, the lever having a lever arm with a free end extending from the lever body, a spring tension rod having a first end connected to the load spring at a fixed spring pivot and a second, opposite end connected to the lever body at a moveable spring pivot spaced from the main pivot, and a load arm mounted to the frame for rotation about the main pivot, the load arm having a first end and an opposite, second end, with the main pivot therebetween, the first end of the load arm being associated with a pipe load, and the second end of the load arm and the free end of the lever arm being joined to pivot in fixed relationship about the main pivot.

The invention thus provides a constant support pipe hanger suitable for use in both horizontal and vertical orientations, thus reducing by one-half all requirements for stock and inventory.

Other features and advantages of the invention will be apparent from the following description of a presently preferred embodiment, and from the claims.

DESCRIPTION OF THE PREFERRED EMBODIMENTS

Figure 1:
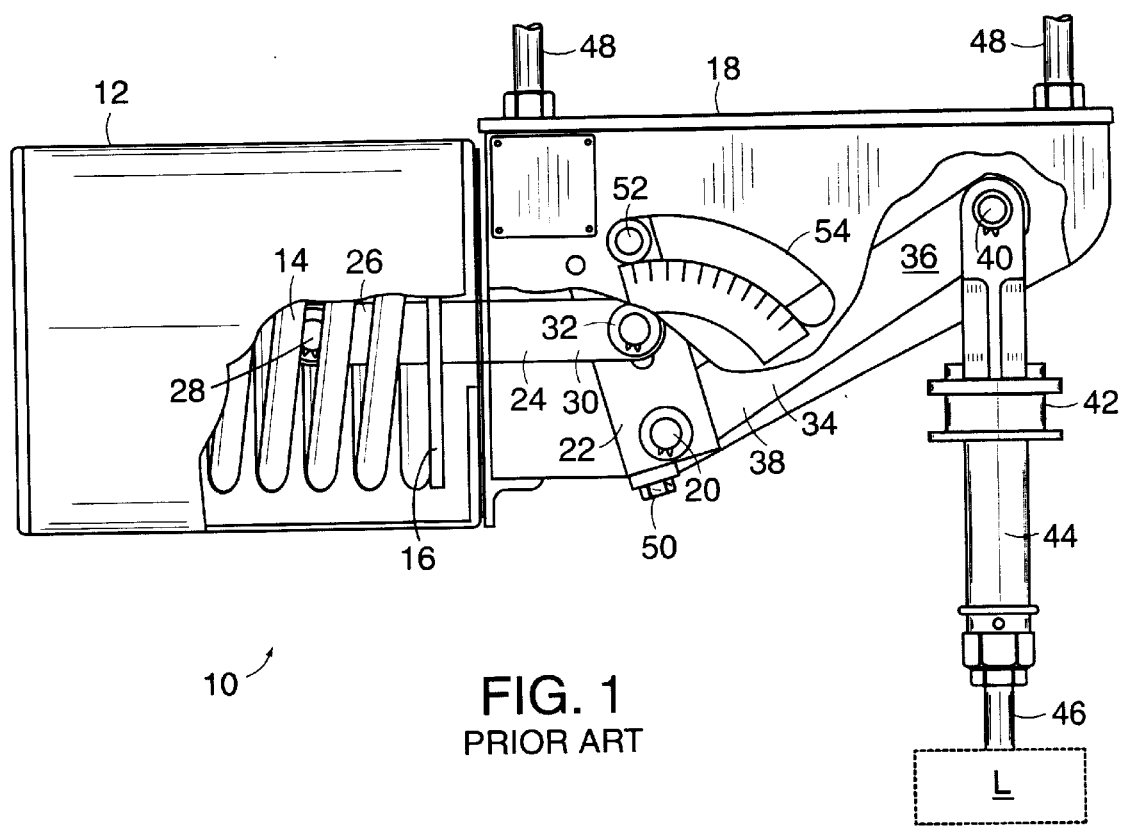
FIG. 1 is a side view of a prior art horizontal design constant support pipe hanger.

Referring to FIG. 1, a constant support pipe hanger 10 of the type known in the art has a spring cover or housing 12 within which a compression load spring 14 is mounted to bear against a trunnion plate 16. A frame 18 is mounted to the spring cover and defines a main pivot 20. A lever body 22 is mounted to the frame for rotation about the main pivot 20. A spring tension rod 24 has a first end 26 connected to the compression load spring 14 at a fixed spring pivot 28 and a second, opposite end 30 connected to the lever body 22 at a moveable spring pivot 32 spaced from the main pivot. A load arm 34 has a first end 36 defining a load pivot 40 for association with a pipe load, L, and a second, opposite end 38 joined in fixed relationship to the lever body 22 for rotation about the main pivot 20 defined by the frame 18. In the drawing, the pipe load, L, is suspended from the load pivot 40 by a load yoke 42, load coupling 44 and lower rod 46, and the constant support pipe hanger is suspended from rods 48. The lever body 22 also includes a load adjustment bolt 50, and a position indicator and travel stop 52 located behind aperture 54 defined by the frame 18.

Figure 2:
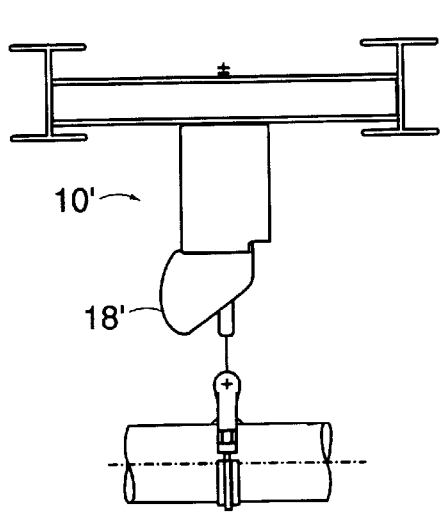
FIGS. 2 and 3 are somewhat diagrammatic side views of prior art constant support pipe hangers of vertical-mount and horizontal-mount designs, respectively.
Figure 3:
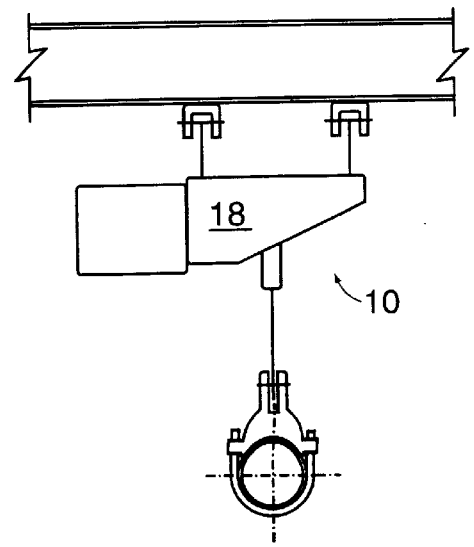

In FIGS. 2 and 3, a vertical mount constant support pipe hanger 10' and a horizontal-mount constant support pipe hanger 10, both of the type known in the art and having corresponding performance characteristics, are seen to have frames 18, 18', respectively, of different configurations, as necessary to meet the requirements of horizontal and vertical orientation, respectively.

Referring again to FIG. 1, as the lever 22 moves from high position to low position, the compression load spring 14 is compressed and the resulting increasing force acting on the decreasing spring moment arm creates a turning moment about the main pivot which is exactly equal and opposite to the turning moment of the load and load moment arm.

As the lever 22 moves from low position to high position, the compression load spring 14 is increasing in length and the resulting decreasing force acting on the increasing spring moment arm creates a turning moment about the main pivot which is exactly equal and opposite to the turning moment of the load and load moment arm.

The geometric design of a constant support pipe hanger 10, e.g. a Model R Constant Support pipe hanger as provided by Grinnell Corporation, of Exeter, N.H., thus provides constant support through the entire deflection of the pipe load.

Figure 4:
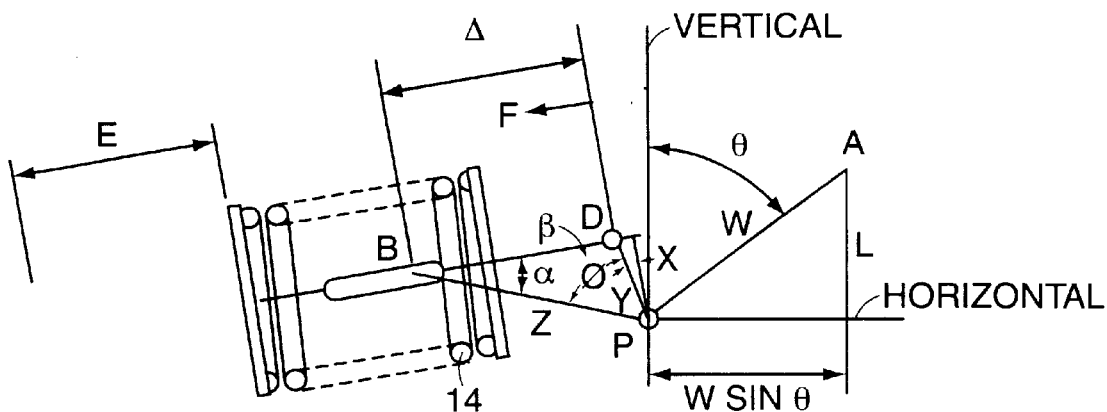
FIGS. 4, 5 and 6 are load and spring moment diagrams for a constant support pipe hanger in high position, mid position and low position, respectively.
Figure 5:
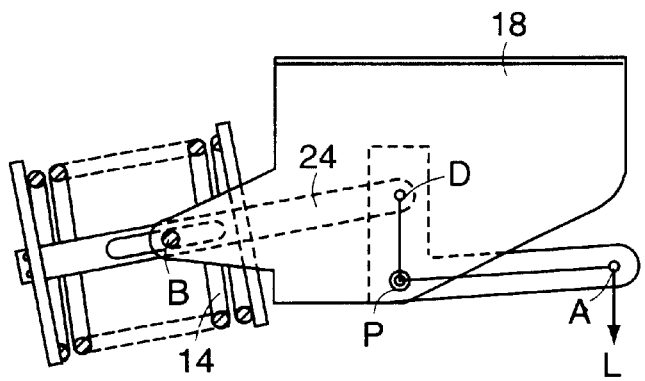
Figure 6:
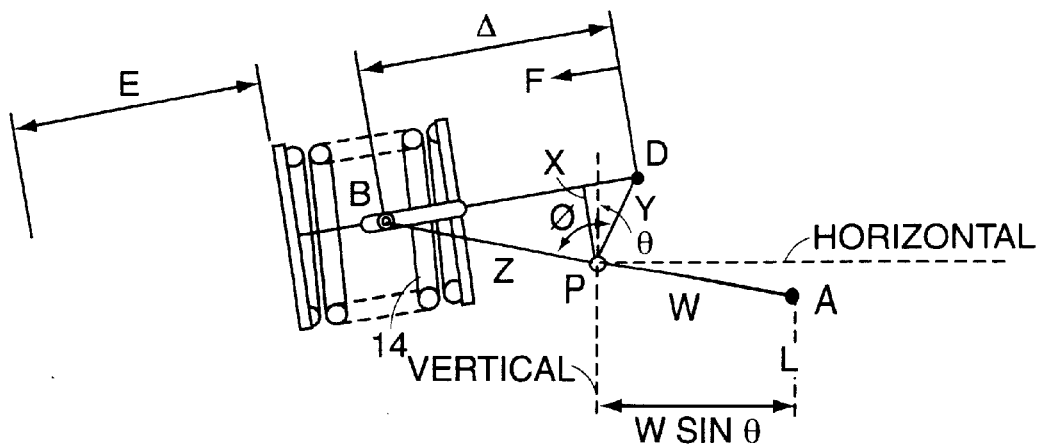

This is shown also with reference to FIGS. 4, 5 and 6, which are diagrams of load and spring moments of a constant support hanger with pipe load, L, in high position, mid position and low position, respectively, and where:

$$\frac{\sin\alpha}{Y} = \frac{\sin\phi}{\Delta} \quad (1)$$

$$\frac{\sin\alpha}{Y} = \frac{\sin\beta}{Z}$$

$$\sin\alpha = \frac{Y\sin\beta}{Z}$$

$$\text{and } Y\sin\beta = X$$

$$\sin\alpha = \frac{X}{Z}$$

Substituting in (1):

$$\frac{X}{YZ} = \frac{\sin\phi}{\Delta} \quad (2)$$

$$X = \frac{YZ\sin\phi}{\Delta} \quad (3)$$

The load, L, is suspended from the lever at point, A, and at any point within the load travel range the moment of the load about the main lever-pivot, P, is equal to the load times its moment arm; thus:

(4) Load moment=L(W sin θ), where W sin θ is the load moment arm.

The spring is attached at one of its ends to the fixed pivot, B. The spring's free end is attached by means of a rod to the lever-pivot, D. This spring arrangement provides a spring moment about the main lever-pivot, P, which opposes the load moment and is equal to the spring force, F, times its moment arm; thus:

$$\text{Spring moment} = F\left(\frac{YZ\sin\phi)}{\Delta}\right), \text{ where } \frac{YZ\sin\phi}{\Delta} \quad (5)$$

is the spring moment arm.

The spring force, F, is equal to the spring constant, K, times the spring deflection, E; thus:

(6) F=KE; therefore equation # 5 may be written:

$$\text{Spring moment} = KE\left(\frac{YZ\sin\phi}{\Delta}\right) \quad (7)$$

To obtain perfect constant support the load moment must always equal the spring moment.

$$LW\sin\theta = \frac{KEYZ\sin\phi}{\Delta} \quad (8)$$

By proper design "φ" and "θ" are made equal. Therefore, equation #8 may be written.

$$LW = \frac{KEYZ}{\Delta} \quad (9)$$

The spring and the rod are so arranged that the spring deflection, E, always equals the distance, Δ, between pivot, B, and pivot, D. therefore, equation #9 may be written.

$$LW = KYZ \quad (10)$$

or $$L = \frac{KYZ}{W} \quad (11)$$

Since equation #11 holds true for all positions of the load within its travel range and K, Y, Z and W remain constant it is therefore true that perfect constant support is obtained.

Figure 7:
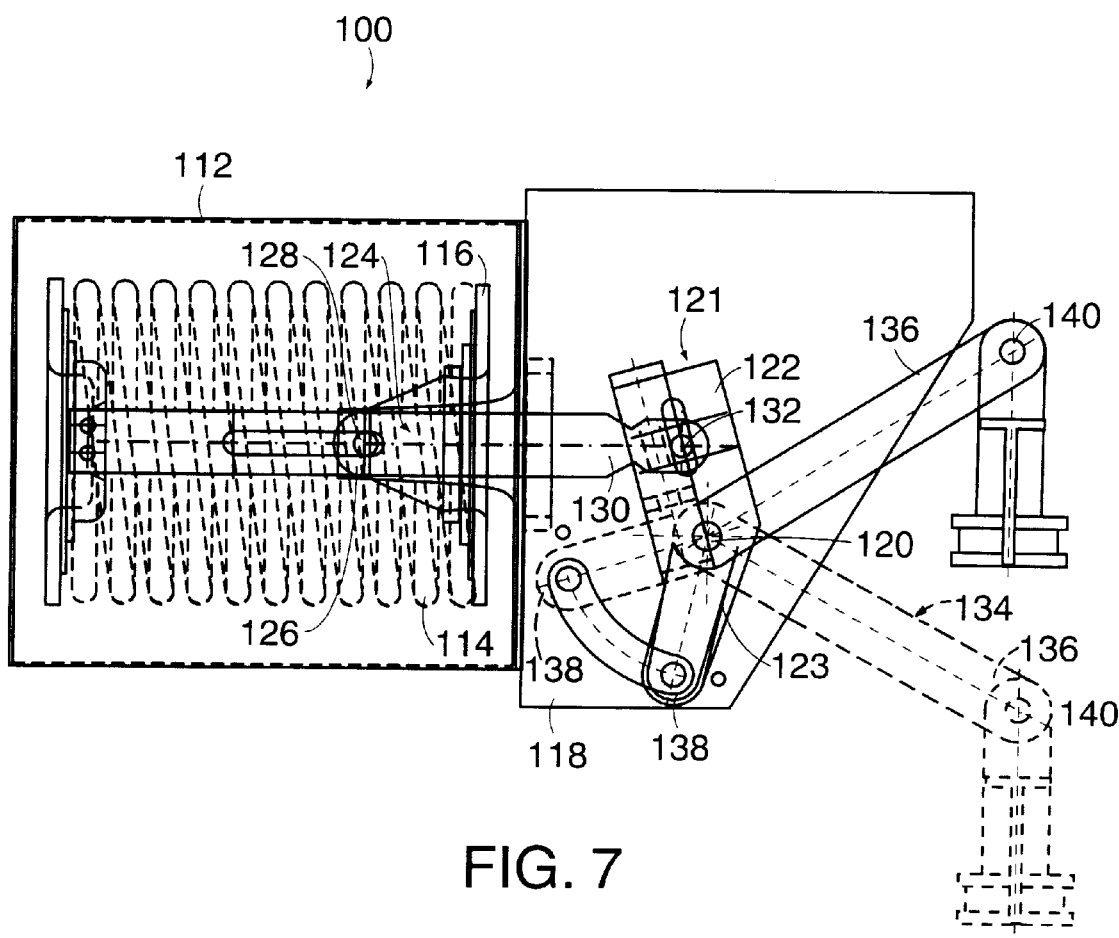
FIGS. 7 and 8 are somewhat diagrammatic side views of a constant support pipe hanger of the invention disposed in horizontal orientation (FIG. 7), and disposed in vertical orientation (FIG. 8).
Figure 8:
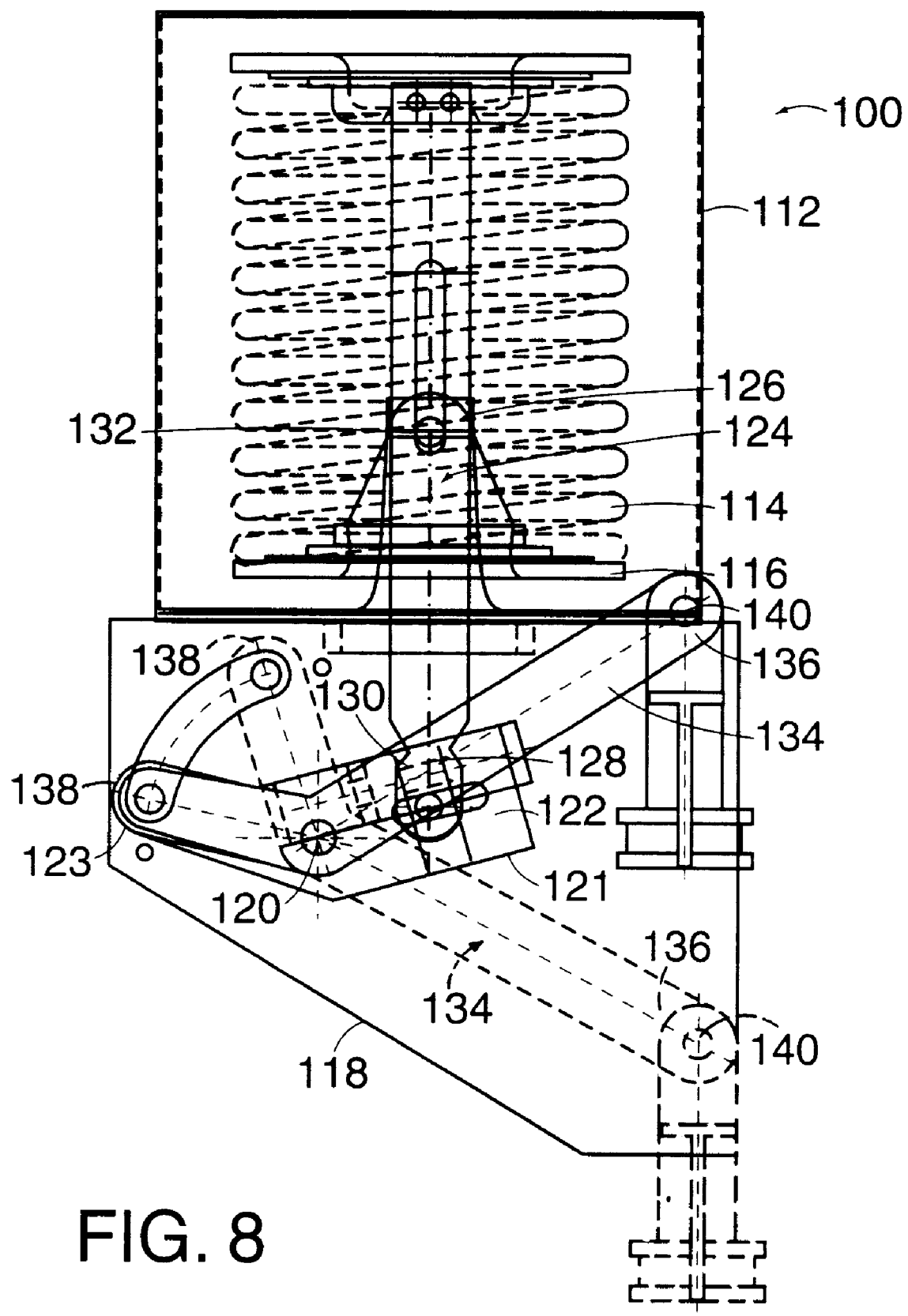

Referring to FIGS. 7 and 8, a constant support pipe hanger 100 of the invention is shown employed in horizontal orientation (FIG. 7) and in vertical orientation (FIG. 8), e.g. as necessary to suit the needs and/or requirements of the situation.

The constant support pipe hanger 100 includes a spring cover or housing 112 within which a compression load spring 114 is mounted to bear against a trunnion plate 116. A frame 118 is mounted to the spring cover and defines a main pivot 120. A lever 121 having a lever body 122 is mounted to the frame for rotation about the main pivot 120, the lever 121 further having a lever arm 123 extending from the lever body 122. A spring tension rod 124 has a first end 126 connected to the compression load spring 114 at a fixed spring pivot 128 and a second, opposite end 130 connected to the lever body 122 at a moveable spring pivot 132 spaced from the main pivot. A load arm 134 is mounted to the frame for rotation about the main pivot 120. (In the drawings, the arm and load are shown in both high position (solid line) and low position (dashed line).) The load arm 134 has a first end 136 and an opposite, second end 138, with the main pivot 120 therebetween. The first end 136 of load arm 134 defines a load pivot 140 for association with a pipe load. The second end 138 of load arm 134 is joined in fixed relationship to the lever arm 123 for rotation about the main pivot 120 defined by the frame 118.

Other embodiments are within the following claims.

What is claimed is:

1. A pipe support hanger having a counterbalance of predetermined load and spring moments about a main pivot through a predetermined range of pipe deflection and adapted for use in vertical and horizontal orientations of said pipe support hanger, said pipe support hanger comprising:

a spring housing, a load spring disposed within said spring housing and bearing upon a trunnion plate, a frame mounted to said spring housing and defining said main pivot, a lever having a lever body mounted to said frame for rotation about said main pivot, said lever having a lever arm with a free end extending from said lever body, a spring tension rod having a first end connected to said load spring at a fixed spring pivot and a second, opposite end connected to said lever body at a moveable spring pivot spaced from said main pivot, and a load arm mounted to said frame for rotation about said main pivot, said load arm having a first end and an opposite, second end, with said main pivot therebetween, said first end of said load arm being associated with a pipe load, and said second end of said load arm and said free end of said lever arm being joined to pivot in fixed relationship about said main pivot.

* * * * *